United States Patent
Keum et al.

(10) Patent No.: US 12,260,614 B2
(45) Date of Patent: Mar. 25, 2025

(54) NEURAL NETWORK MODEL TRAINING METHOD AND APPARATUS FOR COMPLEX CHARACTERISTIC CLASSIFICATION AND COMMON LOCALIZATION

(71) Applicant: WAYCEN INC., Seoul (KR)

(72) Inventors: Jisoo Keum, Gyeonggi-do (KR); Sangil Oh, Seoul (KR); Kyungnam Kim, Gyeonggi-do (KR)

(73) Assignee: WAYCEN INC., Seoul (KR)

( * ) Notice: Subject to any disclaimer, the term of this patent is extended or adjusted under 35 U.S.C. 154(b) by 463 days.

(21) Appl. No.: 17/777,246

(22) PCT Filed: Jul. 29, 2021

(86) PCT No.: PCT/KR2021/009939
§ 371 (c)(1),
(2) Date: May 16, 2022

(87) PCT Pub. No.: WO2022/025690
PCT Pub. Date: Feb. 3, 2022

(65) Prior Publication Data
US 2022/0406035 A1 Dec. 22, 2022

(30) Foreign Application Priority Data
Jul. 31, 2020 (KR) ........................ 10-2020-0095773

(51) Int. Cl.
G06V 10/764 (2022.01)
G06V 10/774 (2022.01)
G06V 10/82 (2022.01)

(52) U.S. Cl.
CPC ........ *G06V 10/764* (2022.01); *G06V 10/7747* (2022.01); *G06V 10/82* (2022.01)

(58) Field of Classification Search
CPC .. G06V 10/764; G06V 10/7747; G06V 10/82; G06V 10/778; G06N 3/04;
(Continued)

(56) References Cited

U.S. PATENT DOCUMENTS

| 11,868,878 B1* | 1/2024 | Huang ................. G06V 10/454 |
| 2022/0019898 A1* | 1/2022 | Kasagi .................. G06N 3/045 |

FOREIGN PATENT DOCUMENTS

| JP | 2017084320 A | 5/2017 |
| JP | 2020080021 A | 5/2020 |

(Continued)

OTHER PUBLICATIONS

B. Zhou, A. Khosla, A. Lapedriza, A. Oliva and A. Torralba, "Learning Deep Features for Discriminative Localization," 2016 IEEE Conference on Computer Vision and Pattern Recognition (CVPR), Las Vegas, NV, USA, 2016, pp. 2921-2929, doi: 10.1109/CVPR.2016.319. https://ieeexplore.ieee.org/document/7780688.*

(Continued)

*Primary Examiner* — Matthew C Bella
*Assistant Examiner* — Andrew B. Jones
(74) *Attorney, Agent, or Firm* — MARSHALL, GERSTEIN & BORUN LLP

(57) ABSTRACT

A neural network model training method and an apparatus for complex characteristic classification and common localization are proposed. In the method, a neural network model includes: a convolution layer for performing a convolution operation on an input image by using a convolution filter; a pooling layer for performing pooling on an output of the convolution layer; and class-specific fully connected layers respectively corresponding to classes into which complex characteristics are classified and outputting values obtained by multiplying an output of the pooling layer by class-specific weights ($W_{fc}(T_r)$). The method includes: (a) inputting the input image to the convolution layer; (b) calculating class-specific observation maps for respective classes on the basis of the output of the convolution layer; (c) calculating an observation loss ($L_{obs}$) common to the classes on the basis of the class-specific observation maps; and (d) back-propagating a loss based on the observation loss to the neural network model.

9 Claims, 20 Drawing Sheets

(58) Field of Classification Search
CPC .......... G06N 3/08; G06N 3/047; G06N 3/084; G06N 3/048
See application file for complete search history.

(56) References Cited

FOREIGN PATENT DOCUMENTS

| KR | 20180025093 A | 3/2018 |
|---|---|---|
| KR | 102074406 B1 | 2/2020 |
| KR | 20200020079 A | 2/2020 |
| KR | 102236615 B1 | 4/2021 |
| WO | WO-2020097461 A1 * | 5/2020 |

OTHER PUBLICATIONS

B. Zhou "Learning Deep Features for Discriminative Localization," 2016 IEEE Conference on Computer Vision and Pattern Recognition (CVPR), Las Vegas, NV, USA, 2016, pp. 2921-2929, doi: 10.1109/CVPR.2016.319. https://ieeexplore.ieee.org/document/7780688 (Year: 2016).*

International Search Report, International Application No. PCT/KR2021/009939, dated Oct. 22, 2021.

* cited by examiner

NEURAL NETWORK MODEL TRAINING METHOD AND APPARATUS FOR COMPLEX CHARACTERISTIC CLASSIFICATION AND COMMON LOCALIZATION

CROSS REFERENCE TO RELATED APPLICATIONS

The present application claims priority PCT/KR2021/009939, filed on Jul. 29, 2021, which claims priority from Application 10-2020-0095773, filed on Jul. 31, 2020, in the Republic of Korea, the entire content of which is incorporated herein for all purposes by this reference.

BACKGROUND OF THE INVENTION

Technical Field

The present disclosure relates to a neural network model training method and an apparatus for complex characteristic classification and common localization.

Acknowledgement of Governmental Support

This invention was supported by the National Research Foundation of Korea (NRF-2021M3E5D9025029), Waycen Inc.

This invention was made under Project No. 1711200061 from the Ministry of Science and ICT of the Republic of Korea under research project "Brain disease overcoming research project", research title "Digital phenotype analysis using reality mining and development of digital therapy using extended phenotype" for the research period of Jul. 1, 2021, through Dec. 31, 2025.

Background Art

FIG. 1A is a view illustrating a neural network model according to the related art.

Referring to FIG. 1A, the neural network model includes an input layer, one or more of convolution layers, pooling layers, and fully connected layers. When there is any input by using such a neural network model, a result value of one of four characteristics A, B, C, and D, or a probability corresponding to each characteristic may be output. In this case, the total sum of the result values may be 100%.

However, any input may have complex characteristics by which a plurality of results is obtainable. For example, in a case where characteristics of A and B are respectively a male, a female, and characteristics of C and D are respectively an Asian and a non-Asian, it is possible to obtain A and C as result values at the same time.

However, in the case of using the conventional neural network model, since the model determines the total sum of each result so as to be 100%, it is difficult to properly reflect these complex characteristics.

SUMMARY OF THE INVENTION

Technical Problem

An objective of an exemplary embodiment of the present disclosure is to provide a neural network model training method and an apparatus that may properly predict complex characteristics.

Technical Solution

According to an exemplary embodiment of the present disclosure, there is provided a neural network model training method for complex characteristic classification and common localization of an image, wherein a neural network model includes: a convolution layer configured to perform a convolution operation on an input image by using a convolution filter; a pooling layer configured to perform pooling on an output of the convolution layer; and a plurality of class-specific fully connected layers configured to respectively correspond to a plurality of classes into which complex characteristics are classified and output values obtained by multiplying an output of the pooling layer by class-specific weights $W_{fc}(T_t)$, and wherein the neural network model training method includes: (a) inputting the input image to the convolution layer; (b) calculating a plurality of class-specific observation maps on the basis of the output of the convolution layer; (c) calculating an observation loss $L_{obs}$ common to the plurality of classes on the basis of the plurality of class-specific observation maps; and (d) back-propagating a loss based on the observation loss $L_{obs}$ to the neural network model.

Step (c) includes: (c-1) generating a common observation map common to the plurality of classes on the basis of the class-specific observation maps; and (c-2) calculating the observation loss $L_{obs}$ by using the common observation map and a target region of the input image.

The common observation map may be an average value of the class-specific observation maps.

The observation loss may be calculated by calculating a cosine distance for concatenated values obtained by respectively projecting the common observation map and the target region of the input image in horizontal and vertical directions.

In step (b), the class-specific observation maps may be calculated by the following equation:

$$\sum_{k=1}^{C} \left( w_{fc}^{k}(T_t) \times o_{conv}^{k} \right)$$

(where, $T_t$ denotes the classes, $W_{fc}(T_t)$ denotes the weights of the class-specific fully connected layers, $o_{conv}$ denotes the output of the convolution layer, and C denotes the number of channels.)

The neural network model may further include: a plurality of class-specific classifiers configured to respectively correspond to the plurality of class-specific fully connected layers, and calculate the class-specific characteristic probabilities according to the outputs of the class-specific fully connected layers.

Step (d) may include: (d-1) calculating class-specific classification losses Los $(T_t)$ on the basis of an output result of each of the plurality of class-specific classifiers; (d-2) calculating class-specific characteristic losses $L(T_t)$ on the basis of the observation loss $L_{obs}$ and the class-specific classification losses Las $(T_t)$; and (d-3) back-propagating, for each class, the class-specific characteristic losses $L(T_t)$ to the plurality of class-specific classifiers and the plurality of class-specific fully connected layers.

In step (d-2), the class-specific characteristic losses $L(T_t)$ may be calculated by the following equation:

$$(1-a)L_{cls}(T_t) + aL_{obs}$$

(where, $0 \le a \le 1$).

Step (d) may further include: (d-4) calculating a multi-label classification loss L(T) on the basis of the plurality of class-specific classification losses $L_{cls}(T_t)$ and the observation loss $L_{obs}$; and (d-5) back-propagating the multi-label classification loss L(T) to the plurality of class-specific classifiers, the plurality of class-specific fully connected layers, the pooling layer, and the convolution layer.

The pooling layer may be a global average pooling layer.

According to the exemplary embodiment of the present disclosure, there is provided a neural network model training apparatus for complex characteristic classification and common localization of an image and including a memory in which a neural network model is stored and a processor, wherein the neural network model includes: a convolution layer configured to perform a convolution operation on an input image by using a convolution filter; a pooling layer configured to perform pooling on an output of the convolution layer; and a plurality of class-specific fully connected layers configured to respectively correspond to a plurality of classes into which complex characteristics are classified and output values obtained by multiplying an output of the pooling layer by class-specific weights $W_{fc}(T_t)$, and wherein the apparatus includes the processor configured to input the input image to the convolution layer, calculate a plurality of class-specific observation maps on the basis of the output of the convolution layer, calculate an observation loss $L_{obs}$ common to the plurality of classes on the basis of the plurality of class-specific observation maps, and back-propagate a loss based on the observation loss $L_{obs}$ to the neural network model.

Advantageous Effects

According to the exemplary embodiment of the present disclosure, the complex characteristics may be properly classified.

According to the exemplary embodiment of the present disclosure, correlations between classes may be reflected.

According to the exemplary embodiment of the present disclosure, common localization between the complex characteristics may be achieved.

DETAILED DESCRIPTION OF THE DRAWINGS

The terms or words used in this description and claims should be interpreted as meanings and concepts corresponding to the technical spirit of the present disclosure based on the principle that inventors may properly define the concept of a term in order to best describe their disclosure.

Throughout the description of the present disclosure, when a part is said to "include" or "comprise" a certain component, it means that it may further include or comprise other components, except to exclude other components unless the context clearly indicates otherwise. In addition, when a case is referred to as that a first component is "connected to", "transmitted to", "sent to", "received from", or "transferred to" a second component, the case includes not only that the first component is directly connected to, transmitted to, sent, received from, or transferred to the second component, but also that the first component is indirectly connected to, transmitted to, sent to, received from, or transferred to the second component by allowing a third component to be interposed therebetween. In addition, the terms "~ part", "~ unit", "module", and the like mean a unit for processing at least one function or operation and may be implemented by a combination of hardware and/or software.

Hereinafter, a specific exemplary embodiment of the present disclosure will be described with reference to the drawings.

Figure 1A:
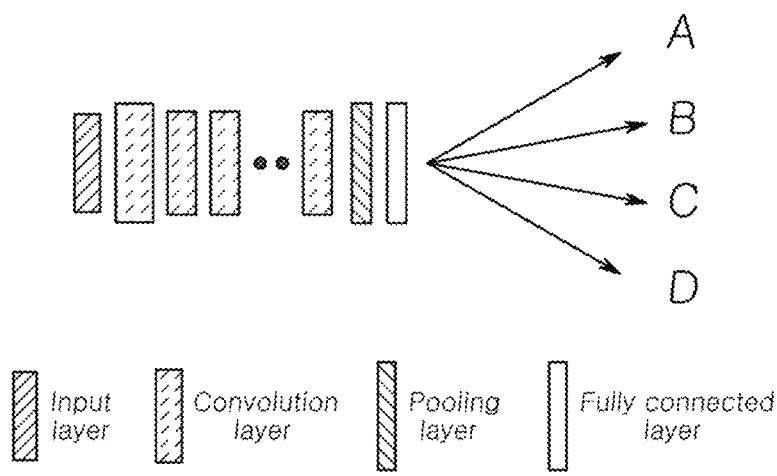
FIG. 1A is a view illustrating a one-to-one model according to the related art.
Figure 1B:
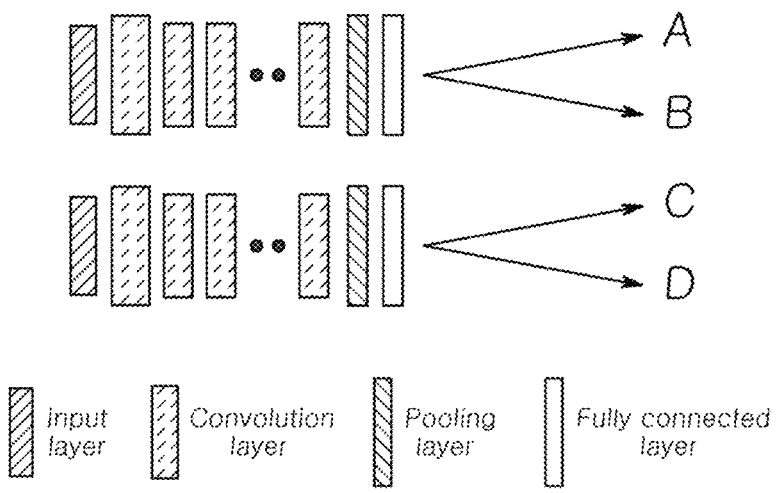
FIG. 1B is a view illustrating that two one-to-one classification models according to a comparative example are used.
Figure 1C:
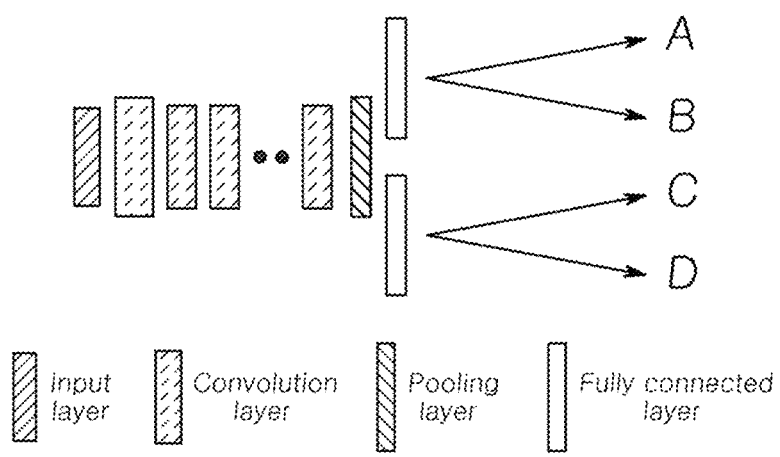
FIG. 1C is a view illustrating a one-to-many model according to an exemplary embodiment of the present disclosure.

FIG. 1B is a view illustrating that two one-to-one classification models according to a comparative example are used, and FIG. 1C is a view illustrating a one-to-many model according to the exemplary embodiment of the present disclosure.

In FIGS. 1A, 1B and 1C, A and B indicate characteristics belonging to class I, and C and D indicate characteristics belonging to class II. The classification criteria of class I and the classification criteria of class II may be different from each other. As such, the characteristics belonging to a plurality of classes are referred to as complex characteristics in the present specification. An input having the complex characteristics may have a plurality of characteristics, that is, a characteristic for each class.

Referring to FIG. 1B, when two one-to-one classification models are used, a sum of predicted probabilities of characteristics A and B is 100%, and a sum of predicted probabilities of characteristics C and D is 100%. In this case, the prediction results may be accurate, but the amount of computation may increase, as two models need to be trained. In addition, since the two models are independently trained, it is difficult to reflect correlations between classes.

Referring to FIG. 1C, in the one-to-many model, some layers, i.e., the convolution layer and the pooling layer, are shared between classes, and the fully connected layers are provided for the respective classes. In this case, since the fully connected layers are provided for the respective classes, the sum of the predicted probabilities of the characteristics A and B is 100%, and the sum of the predicted probabilities of the characteristics C and D is 100%. Accordingly, since the prediction result in the class I and the prediction result in the class II are provided separately, more accurate prediction results than that of FIG. 1A may be obtained. In addition, since the convolution layer is shared between classes, the correlations between the classes may be reflected while reducing the amount of computation compared to that of the model of FIG. 1B.

In the neural network model training method for complex characteristic classification and common localization of an image according to the exemplary embodiment of the present disclosure, in the neural network model, a convolution layer configured to perform a convolution operation on an input image by using a convolution filter, a pooling layer configured to perform pooling on an output of the convolution layer, and a plurality of class-specific fully connected layers configured to respectively correspond to a plurality of classes into which complex characteristics are classified, and output values obtained by multiplying an output of the pooling layer by class-specific weights $W_{fc}(T_t)$ are included.

In the method, (a) inputting an input image to a convolution layer, (b) calculating class-specific observation maps on the basis of an output of the convolution layer, (c) calculating an observation loss $L_{obs}$ that is common to the plurality of classes on the basis of the class-specific observation maps, and (d) back-propagating a loss based on the observation loss $L_{obs}$ to a neural network model are included.

Figure 2:
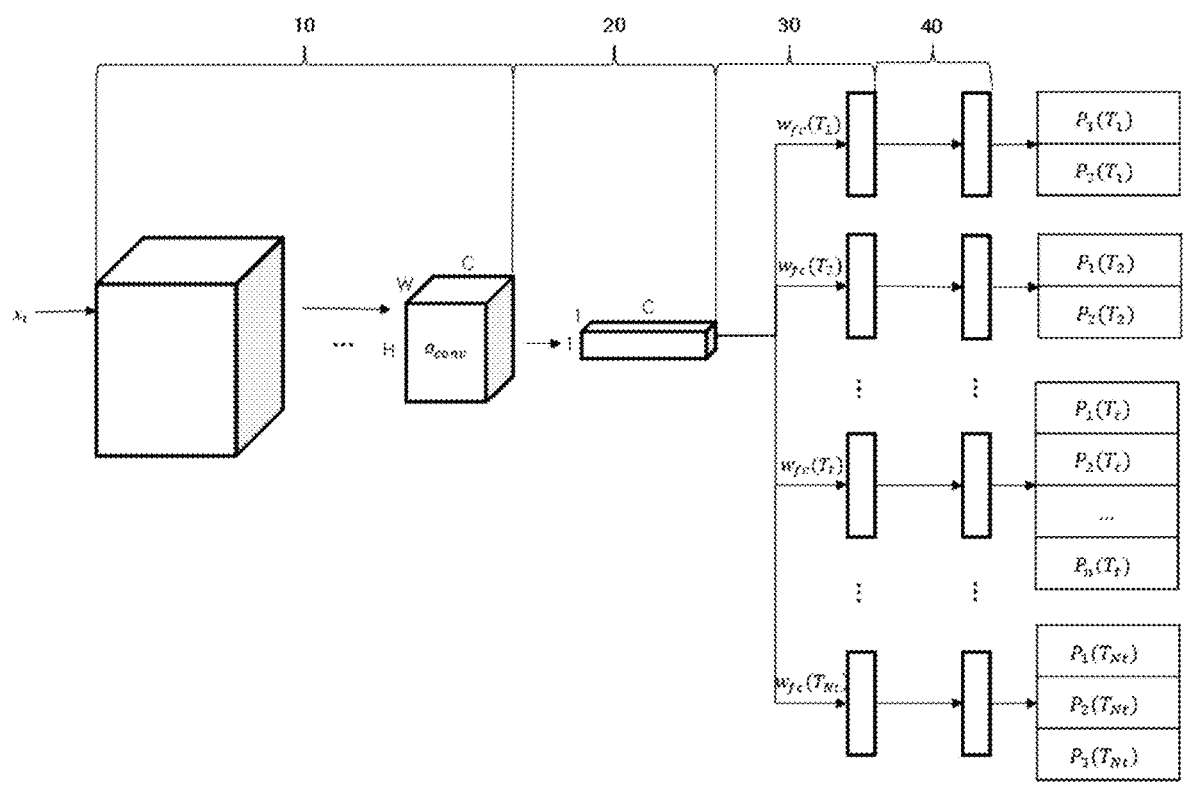
FIG. 2 is a view illustrating a structure of a neural network model 1 according to the exemplary embodiment of the present disclosure.

FIG. 2 is a view illustrating a structure of a neural network model 1 according to the exemplary embodiment of the present disclosure. In FIG. 2, it is assumed that there are $N_T$ classes $T_1, T_2, \ldots T_t, \ldots T_{NT}$, wherein class $T_1$ has two characteristics, class $T_2$ has two characteristics, class $T_t$ has n characteristics, and class $T_{NT}$ has three characteristics.

Referring to FIG. 2, the neural network model 1 according to the exemplary embodiment of the present disclosure includes: a convolution layer 10 configured to perform a convolution operation on an input image $x_i$ by using a convolution filter; a pooling layer 20 configured to perform pooling on an output $o_{conv}$ of the convolution layer 10; and a plurality of fully connected layers 30 configured to respectively correspond to a plurality of classes into which complex characteristics are classified, and output values obtained by multiplying an output of the pooling layer 20 by class-specific weights $W_{fc}(T_t)$.

The neural network model 1 may further include: a plurality of class-specific classifiers 40 configured to respectively correspond to the plurality of class-specific fully connected layers 30, and calculate class-specific characteristic probabilities according to outputs of the class-specific fully connected layers 30.

The convolution layer 10 performs a convolution operation on an input image by using a plurality of convolution filters, so as to extract a feature map. As shown in FIG. 2, the convolution operation may be performed multiple times. It is assumed that the output of the convolution layer 10, that is, the feature map $o_{conv}$ has a height H, a width W, and the number of channels C.

The pooling layer 20 is positioned between the convolution layer 10 and the fully connected layers 30, and serves to reduce the size of the feature map $o_{conv}$, so as to reduce operations required in the fully connected layers 30, which will be described later and to prevent overfitting. The pooling layer 20 may perform global average pooling that outputs an average value for each channel of the feature map $o_{conv}$.

Each class-specific fully connected layer 30 outputs values obtained by respectively multiplying the outputs of the pooling layer 20 with the class-specific weights $W_{fc}(T_1)$, $W_{fc}(T_2), \ldots W_{fc}(T_t), \ldots W_{fc}(T_{NT})$. In this case, each of the class-specific weights $W_{fc}(T_1)$, $W_{fc}(T_2), \ldots W_{fc}(T_t), \ldots W_{fc}(T_{NT})$ may be a value of a plurality of values corresponding to the number of channels.

The class-specific classifiers 40 respectively correspond to the class-specific fully connected layers 30, and calculate the class-specific characteristic probabilities according to the outputs of the class-specific fully connected layers 30. Referring to FIG. 2, a classifier corresponding to a class $T_1$ calculates probabilities $P_1(T_1)$ and $P_2(T_1)$ respectively corresponding to characteristics belonging to the class $T_1$, a classifier corresponding to a class $T_2$ calculates probabilities $P_1(T_2)$ and $P_2(T_2)$ respectively corresponding to characteristics belonging to the class $T_2$, a classifier corresponding to a class T, calculates probabilities $P_1(T_t), P_2(T_t), \ldots P_n(T_t)$ respectively corresponding to characteristics belonging to the class $T_t$, and a classifier corresponding to a class $T_{NT}$ calculates probabilities $P_1(T_{NT})$, $P_2(T_{NT})$, and $P_3(T_{NT})$ respectively corresponding to characteristics belonging to the class $T_{NT}$. For example, a Softmax function, a Sigmoid function, or the like may be used as the class-specific classifiers 40.

Next, a neural network model training method according to the exemplary embodiment of the present disclosure will be described with reference to FIGS. 3 and 4.

Figure 3:
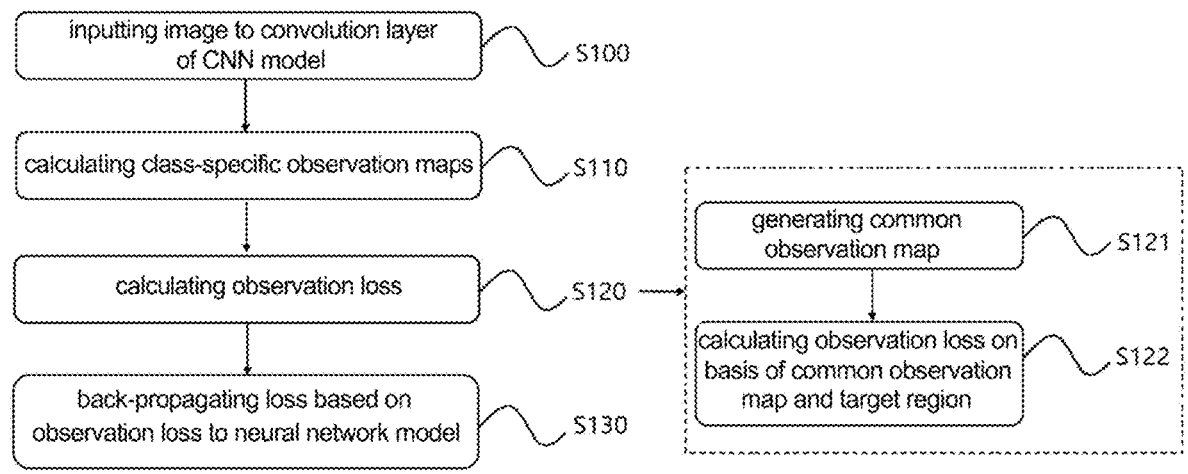
FIG. 3 is a flowchart illustrating a neural network model training method according to the exemplary embodiment of the present disclosure.
Figure 4:
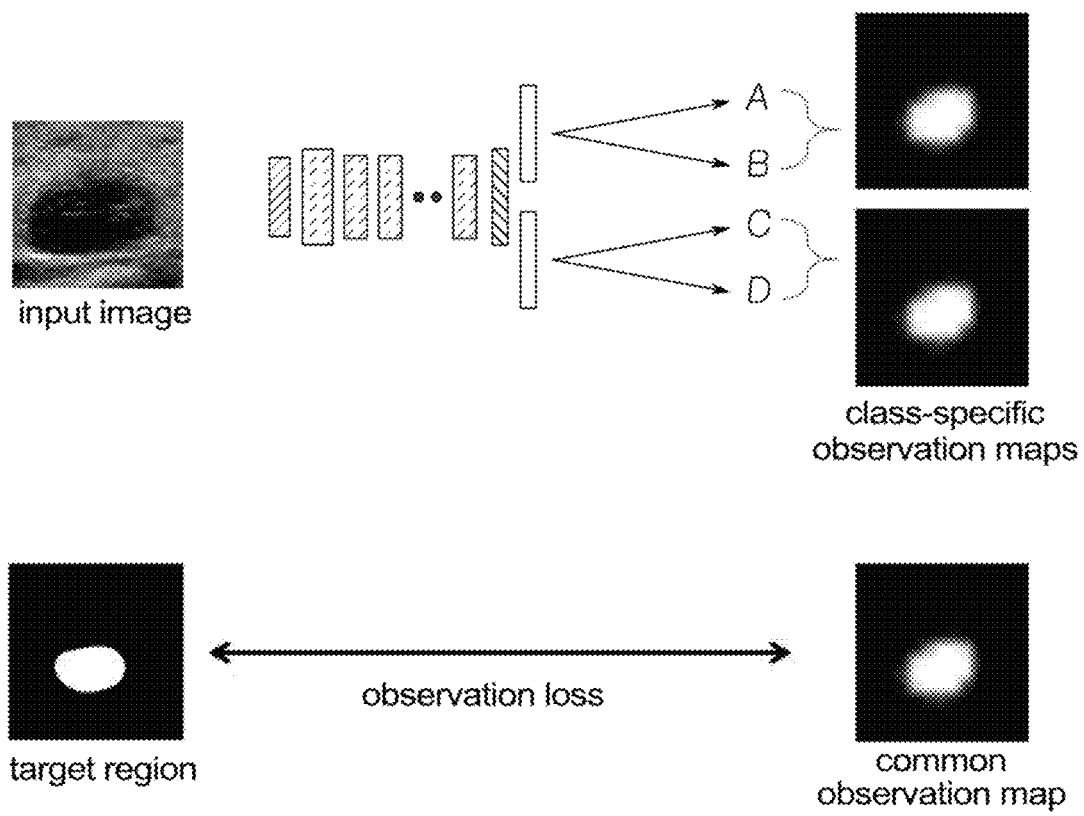
FIG. 4 is a view illustrating the training method of FIG. 3.

FIG. 3 is a flowchart illustrating the neural network model training method according to the exemplary embodiment of the present disclosure, and FIG. 4 is a view illustrating the training method of FIG. 3. The neural network model of FIG. 2 is used as the neural network model training method according to the exemplary embodiment of the present disclosure.

Referring to FIG. 3, first, in step S100, an image is input to a convolution layer of the neural network model. The class-specific characteristics (i.e. complex characteristics) of the input image and a target region are already known. Here, the target region is a part of the input image, and refers to a part that has a major influence on determining the class-specific characteristics. For example, as shown in FIG. 4, when the input image is an ultrasound image, the target region may be a part in which a lesion appears. The target region may be the same for a plurality of classes.

Next, in step S110, a plurality of class-specific observation maps is calculated on the basis of outputs of the convolution layer.

Each observation map, also called a class activation map (CAM), indicates how much each part of the input image affects a classification result. In the present exemplary embodiment, each observation map is calculated for each class. FIG. 4 illustrates an example of class-specific observation maps. The class-specific observation maps may be calculated by the following equation.

$$\sum_{k=1}^{C} \left( w_{fc}^k(T_t) \times o_{conv}^k \right),$$

where, $T_t$ denotes the classes, $W_{fc}(T_t)$ denotes the weights of the class-specific fully connected layers, $o_{conv}$ denotes the output of the convolution layer, and C is the number of channels.

Next, in step S120, an observation loss common to the plurality of classes is calculated on the basis of the plurality of class-specific observation maps.

According to the exemplary embodiment, step S120 may include: step S121 of generating a common observation map that is common to the plurality of classes on the basis of the plurality of class-specific observation maps; and step S122 of calculating an observation loss by using the common observation map and the target region of the input image. The observation loss may be calculated on the basis of differences between the target region of the input image and the common observation map. The common observation map may be an average value of the class-specific observation maps, and may be calculated by the following equation.

$$\frac{1}{N_T}\sum_{t=1}^{N_T}\sum_{k=1}^{C}\left(w_{fc}^k(T_t)\times o_{conv}^k\right)$$

Here, $$\sum_{k=1}^{C}\left(w_{fc}^k(T_t)\times o_{conv}^k\right)$$

denotes the class-specific observation maps described above, and $N_T$ denotes the number of classes.

However, this is only an example, and the ratio of class-specific observation maps may be allowed to be different, or the common observation map may be calculated on the basis of the observation maps of some classes among all classes.

The observation loss may be calculated by using the calculated common observation map and the target region of the input image.

For example, the observation loss may be calculated by the following equation.

$$\mathcal{L}_{obs}=\frac{1}{2N_x}\sum_{i=1}^{N_x}\left(\|M_H^i\|-\|\hat{M}_H^i\|\right)^2+\left(\|M_V^i\|-\|\hat{M}_V^i\|\right)^2$$

Here, $$\|M\|=\frac{M}{\sqrt{\max\left(\sum M^2,\epsilon\right)}},$$

ε: lower bound value.

$$M_H=\sum_{h=0}^{H}M(h,W),\ M_V=\sum_{w=0}^{W}M(H,w),$$

$M^i$ denotes a target region of an input image $x_i$, and $\hat{M}^i$ denotes a common observation map of the input image $x_i$.

FIGS. 5 and 6 are views illustrating a method of calculating the observation loss according to the exemplary embodiment of the present disclosure.

Figure 5A:
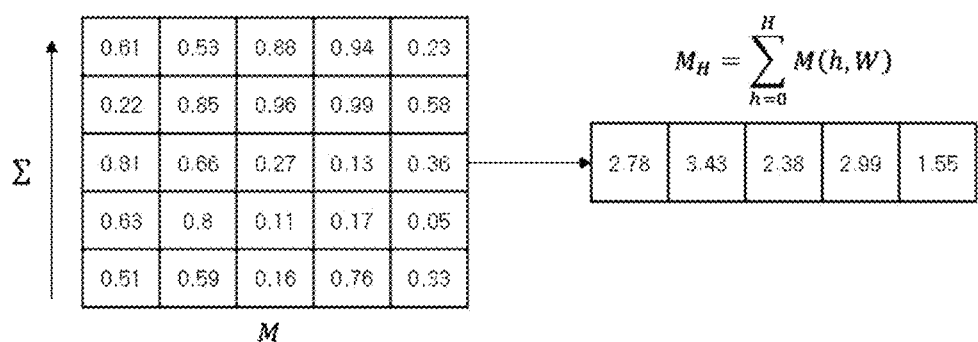
FIGS. 5A, 5B, 6A, 6B, 6C and 6D are views illustrating a method of calculating an observation loss according to the exemplary embodiment of the present disclosure.
Figure 5B:
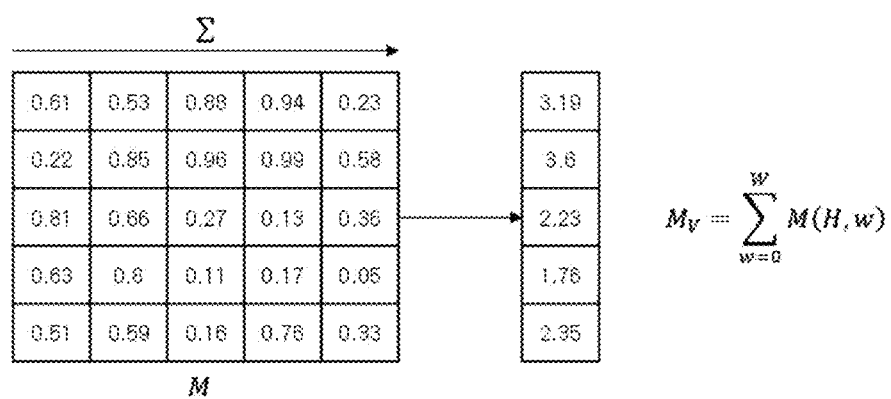

FIG. 5A illustrates a value $M_H$ obtained by projecting a target region of an input image along a vertical direction, and FIG. 5B illustrates a value $M_v$ obtained by projecting the target region of the input image along a horizontal direction.

Although only the target region of the input image has been described as an example in FIG. 5A, the values may also be calculated by projecting the common observation map along the horizontal and vertical directions in the same manner.

Figure 6A:
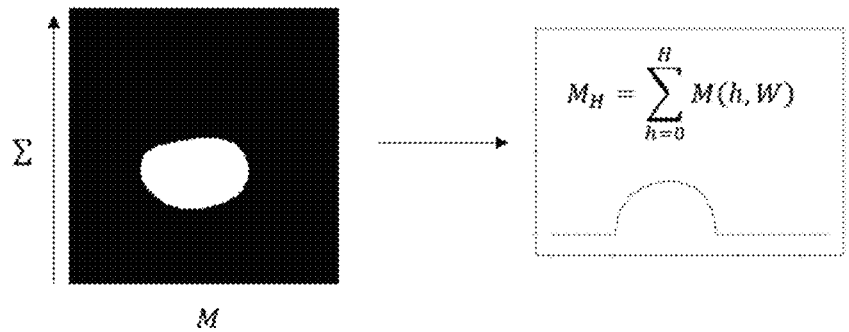
Figure 6B:
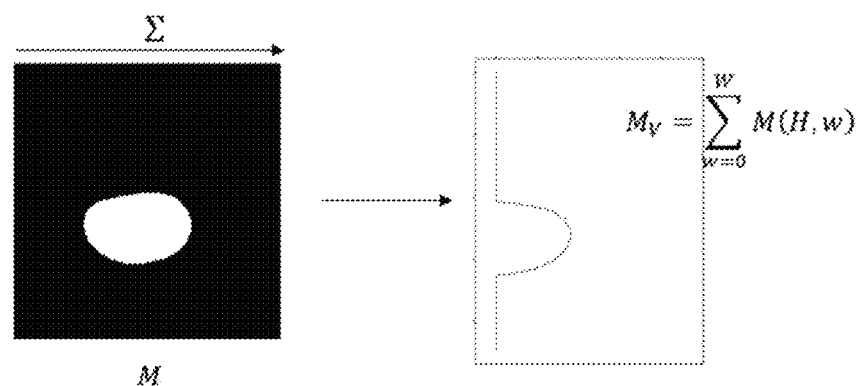
Figure 6C:
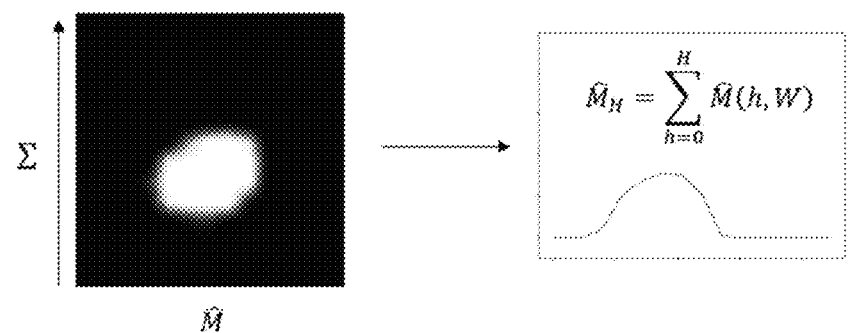
Figure 6D:
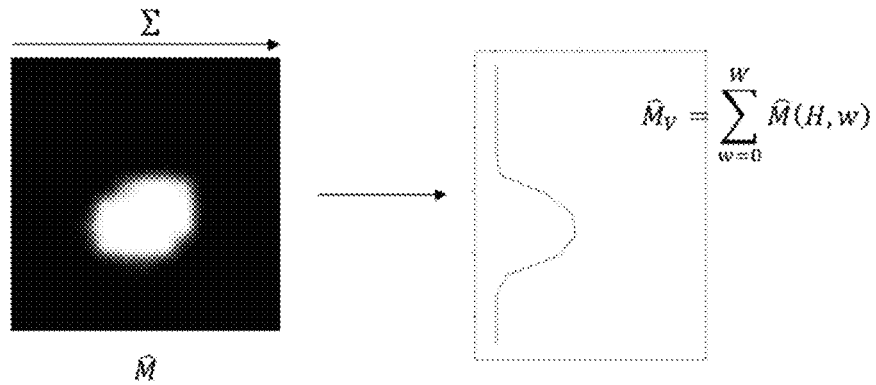

FIG. 6A is a graph illustrating a value obtained by projecting a target region of an input image along a vertical direction, FIG. 6B is a graph illustrating a value obtained by projecting the target region of the input image along a horizontal direction, FIG. 6C is a graph illustrating a value obtained by projecting a target region of an common observation map along the vertical direction, and FIG. 6D is a graph illustrating a value obtained by projecting the target region of the common observation map along the horizontal direction.

According to the exemplary embodiment, the observation loss may be obtained by calculating a cosine distance for the concatenated values obtained by respectively projecting the common observation map and the target region of the input image in the horizontal and vertical directions.

That is, the observation loss may be calculated by the following equation.

$$\mathcal{L}_{obs}=\frac{1}{N_x}\sum_{i=1}^{N_x}\frac{\sum_{j=1}^{n}\left(M_{HV}^j\times\hat{M}_{HV}^j\right)}{\sqrt{\sum_{j=1}^{n}(M_{HV}^j)^2}\times\sqrt{\sum_{j=1}^{n}(\hat{M}_{HV}^j)^2}}$$

$M_{HV}$ = concatenate of $M_H$ and $M_V$,

In a case of using the above equation, it is possible to reflect an overall distribution rather than the accuracy in units of pixels.

Next, referring back to FIG. 3, in step S130, a loss based on the observation loss is back-propagated to the neural network model.

Steps S100 to S130 described above may be performed on a plurality of input images, and accordingly, the neural network model may be trained.

Although the observation map is generated for each class in the present exemplary embodiment, the observation loss is equally applied to the plurality of classes. Accordingly, an effect that the observation map becomes the same for the plurality of classes, that is, an effect of common localization may be thus acquired.

Figure 7:
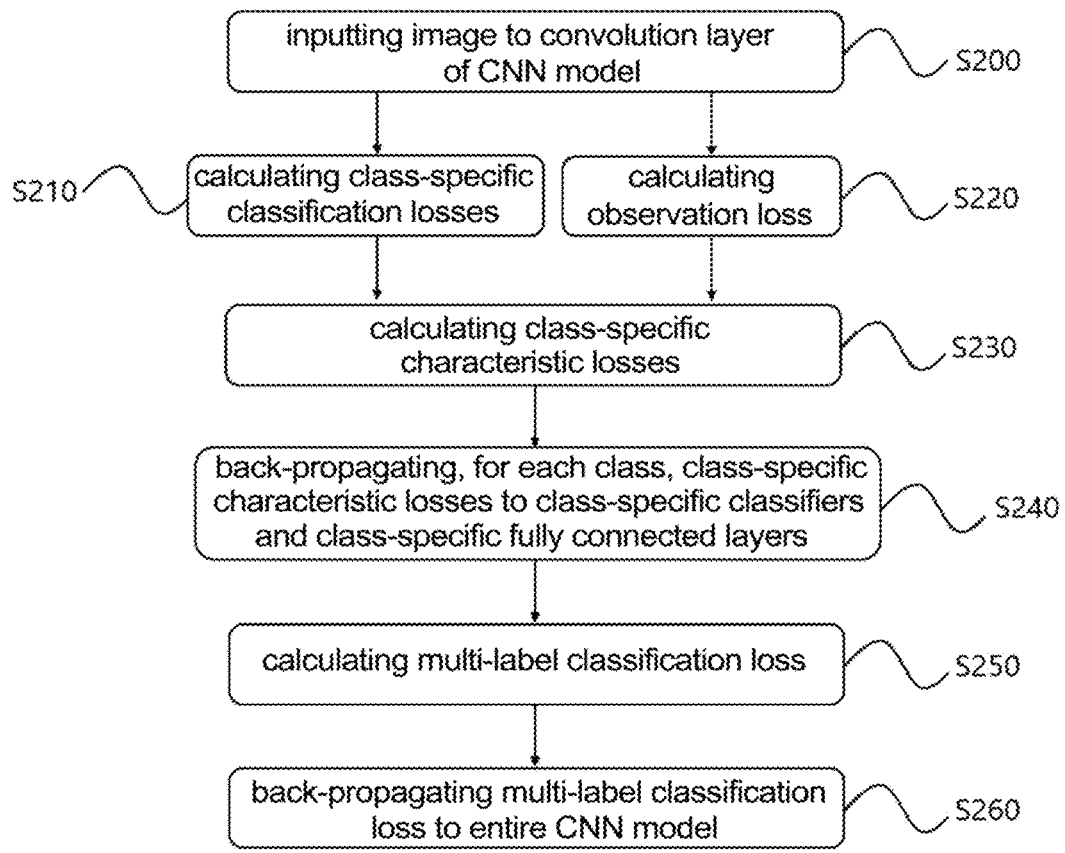
FIG. 7 is a flowchart illustrating the neural network model training method according to the exemplary embodiment of the present disclosure.

FIG. 7 is a flowchart illustrating the neural network model training method according to the exemplary embodiment of the present disclosure.

First, in step S200, an image is input to a convolution layer of the neural network model.

Next, in steps S210 and S220, class-specific classification losses and an observation loss are calculated from the neural network model.

The class-specific classification losses are values indicating how accurately a characteristic belonging to each class is predicted, and is calculated for each class. The class-specific classification losses may be calculated on the basis of each output result of the plurality of class-specific classifiers. For example, the class-specific classification losses may be calculated from differences between class-specific characteristics of the input image and class-specific characteristic probabilities (refer to $P_1(T_t)$, $P_2(T_t)$, ..., $P_n(T_t)$ of FIG. 2), which are the outputs of the class-specific classifiers.

The class-specific classification losses may be calculated by the following equation.

$$\mathcal{L}_{cls}(T_t)=-\frac{1}{N_x}\sum_{i=1}^{N_x}\sum_{c=0}^{C_{T_t}}I(y_i^c)\log p^c(x_i),$$

$$I(y_i^c):=\begin{cases}1 & \text{if } y_i\in c\\ 0 & \text{else}\end{cases},$$

Here, $p^c(x_i)$ denotes the output probabilities of the class-specific characteristics c for the entire class $T_t$ of the input image $x_i$, $N_x$ denotes the number of training images, and $C_{Tt}$ denotes the number of class-specific characteristics belonging to the class $T_t$.

Since the observation loss is the same as described above, a redundant description is omitted.

Next, in step S230, class-specific characteristic losses are calculated on the basis of the class-specific classification losses and the observation loss.

The class-specific characteristic losses are values that reflect the observation loss and the class-specific classification losses. As described above, although the observation loss is the same for the plurality of classes, since the class-specific classification losses are different for each class, the class-specific characteristic losses may have a different value for each class.

The class-specific characteristic losses may be calculated by the following equation.

$$(1-a)L_{cls}(T_t)+\alpha L_{obs}$$

Here, $L_{cls}(T_t)$ denotes the class-specific classification losses, $L_{obs}$ denotes the observation loss, and a condition $0 \leq \alpha \leq 1$ is satisfied.

Next, in step S240, the class-specific characteristic losses are back-propagated for each class to the plurality of class-specific classifiers and the plurality of class-specific fully connected layers.

Referring to the neural network model of FIG. 2, each of the class-specific fully connected layers 30 and class-specific classifiers 40 respectively corresponds to class-specific branches. That is, the class-specific characteristic losses are back-propagated only to a part corresponding to the class-specific branches of the neural network model. In addition, the class-specific characteristic losses are back-propagated for each class. Specifically, referring to FIG. 2, a characteristic loss of a class $T_1$ may be back-propagated to the classifier 40 and fully connected layer 30 that correspond to the class $T_1$, a characteristic loss of a class $T_2$ may be back-propagated to the classifier 40 and fully connected layer 30 that correspond to the class $T_2$, a characteristic loss of a class $T_r$ may be back-propagated to the classifier 40 and fully connected layer 30 that correspond to the class $T_r$, and a characteristic loss of a class $T_{NT}$ may be back-propagated to the classifier 40 and fully connected layer 30 that correspond to the class $T_{NT}$.

Next, in step S250, a multi-label classification loss is calculated.

The multi-label classification loss is a value that reflects the class-specific classification losses calculated for each class, unlike the class-specific classification losses in the previous step (refer to S210). The multi-label classification loss may be calculated on the basis of the plurality of class-specific classification losses and the observation loss. The multi-label classification loss is equally applied for the plurality of classes.

The class-specific weights of the plurality of class-specific fully connected layers 30 are adjusted by the back-propagation of step S240, and accordingly, the plurality of class-specific classification losses and the observation loss may also be changed. The multi-label classification loss may be calculated on the basis of the plurality of class-specific classification losses and the observation loss, which have been changed.

The multi-label classification loss may be calculated by the following equation.

$$\mathcal{L}_{cls}(T) = -\frac{1}{N_x} \sum_{i=1}^{N_x} \sum_{c=0}^{C_T} [I(y_i^c) \log p^c(x_i) + (1 - I(y_i^c)) \log(1 - p^c(x_i))]$$

Here, $$I(y_i^c) := \begin{cases} 1 & \text{if } y_i \in c \\ 0 & \text{else} \end{cases},$$

$p^c(x_i)$ denotes the output probabilities of the class-specific characteristics c for the plurality of all classes of the input image $x_i$, $N_x$ denotes the number of training images, and CT denotes the number of class-specific characteristics for the plurality of all classes.

Next, in step S260, the multi-label classification loss is back-propagated throughout the entire neural network model.

Referring to FIG. 2, the entire neural network model represents the plurality of class-specific classifiers 40, the plurality of class-specific fully connected layers 30, the pooling layer 20, and the convolution layer 10. Accordingly, parameter values of the neural network model, for example, a convolution filter of the convolution layer 10, class-specific weights of the class-specific fully connected layers 30, and the like may be adjusted.

Steps S200 to S260 described above may be performed on a plurality of input images, and accordingly, the neural network model may be trained.

Next, a data flow for training the neural network model according to the exemplary embodiment of the present disclosure will be described with reference to FIGS. 8 and 9.

Figure 8:
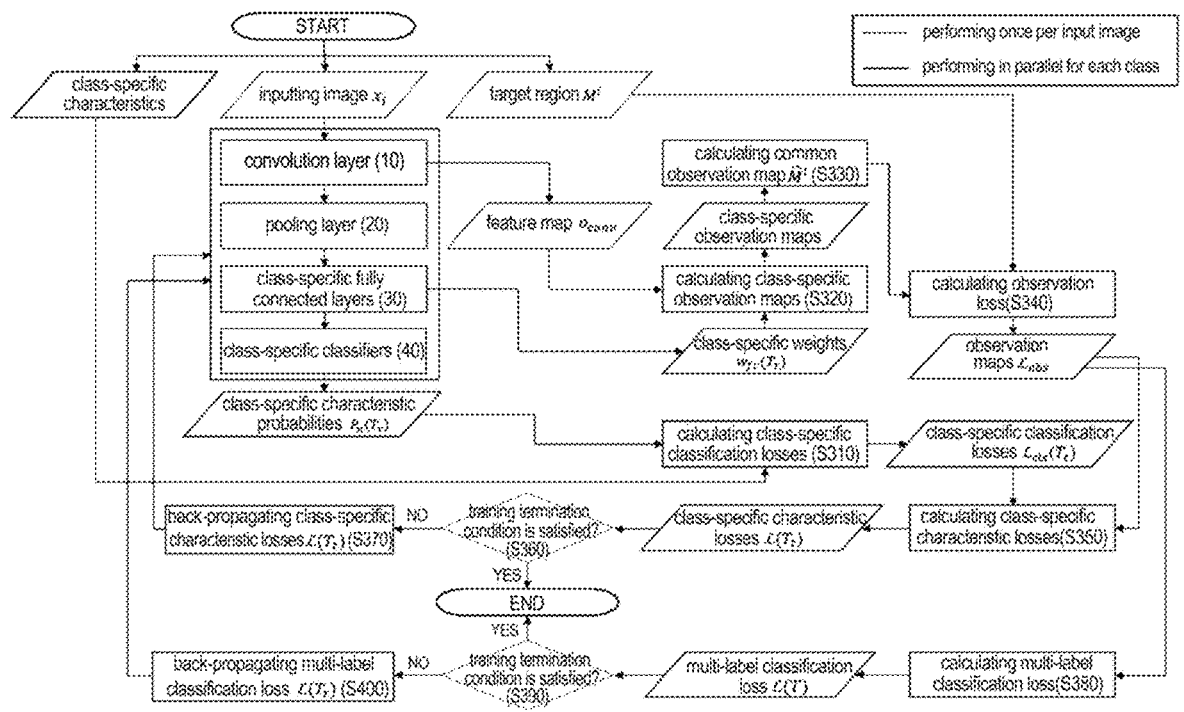
FIG. 8 is a data flow diagram illustrating the neural network model training method according to the exemplary embodiment of the present disclosure.

FIG. 8 is a data flow diagram illustrating the neural network model training method according to the exemplary embodiment of the present disclosure, and FIG. 9 is a set of views illustrating parts corresponding to respective steps of FIG. 6 in the neural network model of FIG. 2. In FIG. 8, the rectangle denotes processing of data and the parallelogram denotes the data.

Figure 9A:
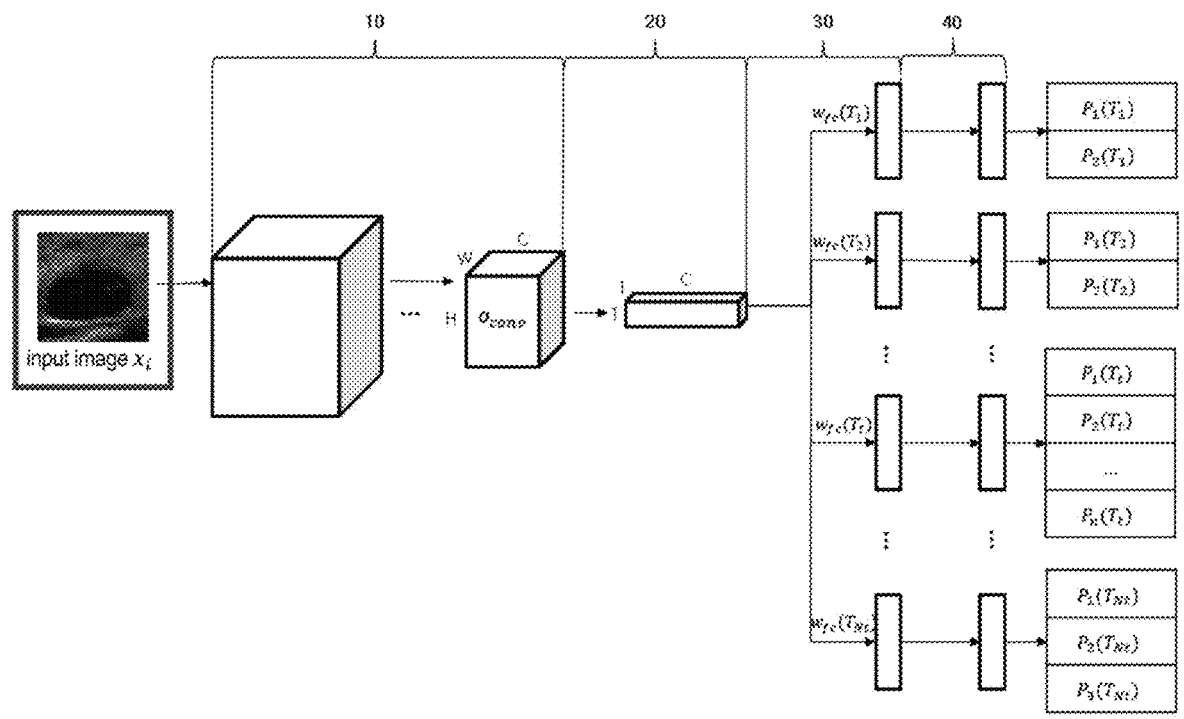
FIGS. 9A to 9J are set of views illustrating parts corresponding to respective steps of FIGS. 7 and 8 in the neural network model of FIG. 2.

Referring to FIGS. 8 and 9A, first, in step S300, an image $x_i$ is input to a neural network model. At this time, class-specific characteristics and a target region of the input image $x_i$ are known in advance.

As described above by referring to FIG. 2, the neural network model includes a convolution layer 10, a pooling layer 20, class-specific fully connected layers 30, and class-specific classifiers 40. Although FIG. 8 illustrates one class-specific fully connected layer 30 and one class-specific classifier 40, these components may be provided as many as the number of classes.

Figure 9B:
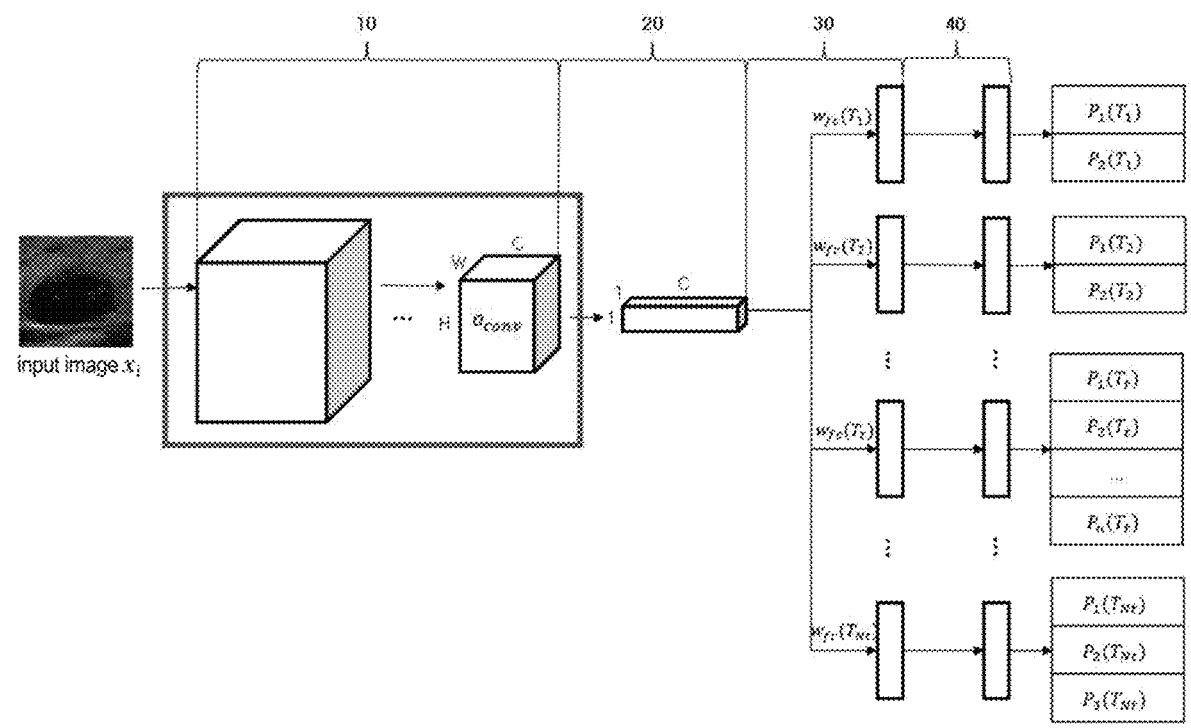

As shown in FIGS. 8 and 9B, as the input image $x_i$ passes through the convolution layer 10, a feature map $o_{conv}$ is output.

Figure 9C:
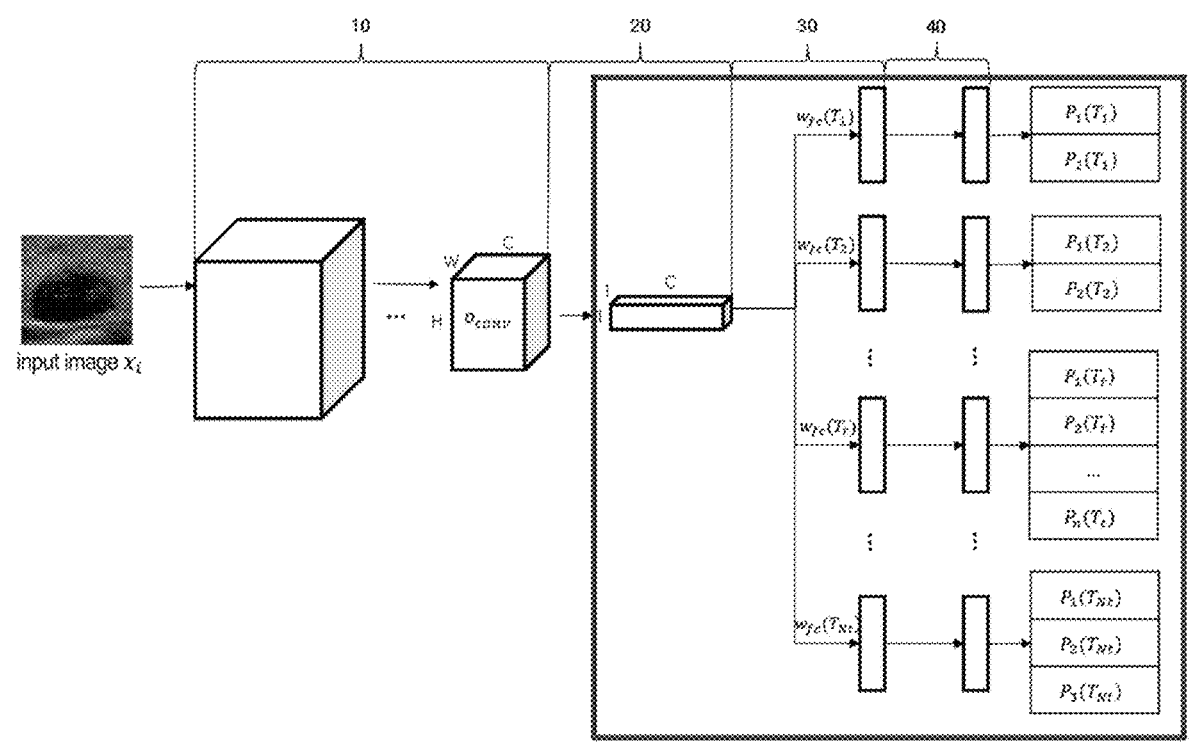

In addition, referring to FIGS. 8 and 9C, the input image that has passed through the convolution layer 10 passes through the rest of the neural network model, that is, the pooling layer 20, the class-specific fully connected layers 30, and the class-specific classifiers 40, whereby class-specific characteristic probabilities $P_n(T_t)$ are output.

Figure 9D:
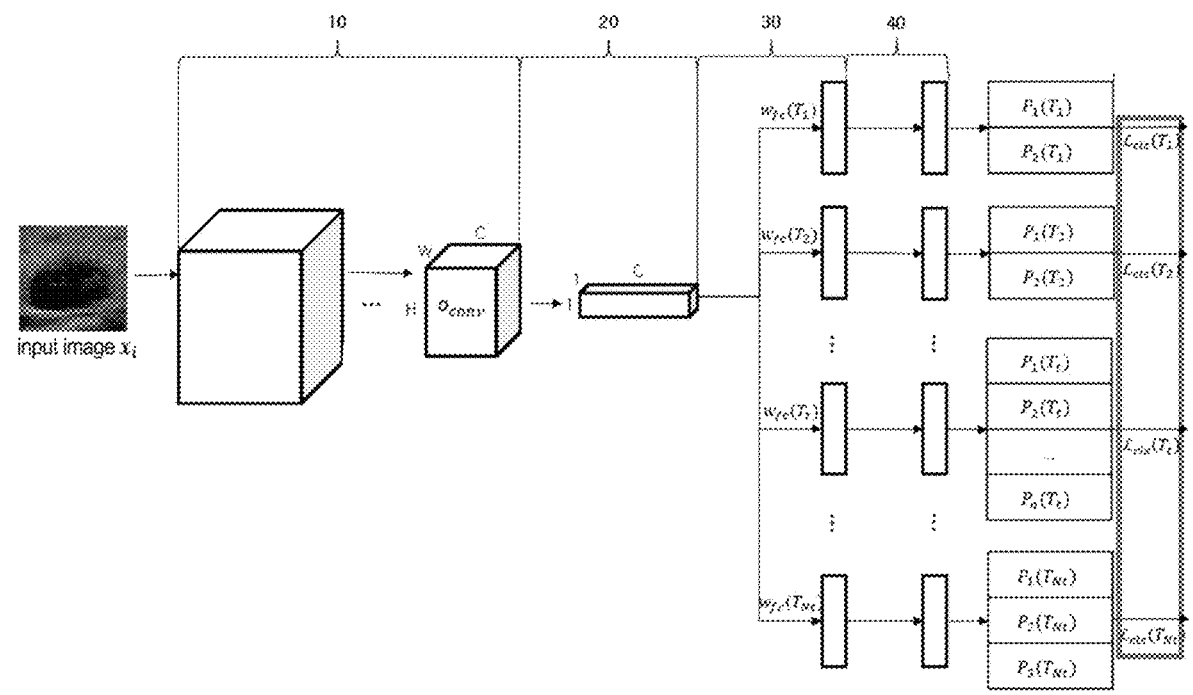

Next, referring to FIGS. 8 and 9D, in step S310, class-specific classification losses $L_{cls}(T_t)$ are calculated on the basis of the class-specific characteristic probabilities $P_n(T_t)$ and the class-specific characteristics of the input image.

Meanwhile, in step S320, class-specific observation maps are calculated on the basis of the output $o_{conv}$ of the convolution layer 10 and weights $W_{fc}(T_t)$ of the class-specific fully connected layers 30.

Figure 9E:
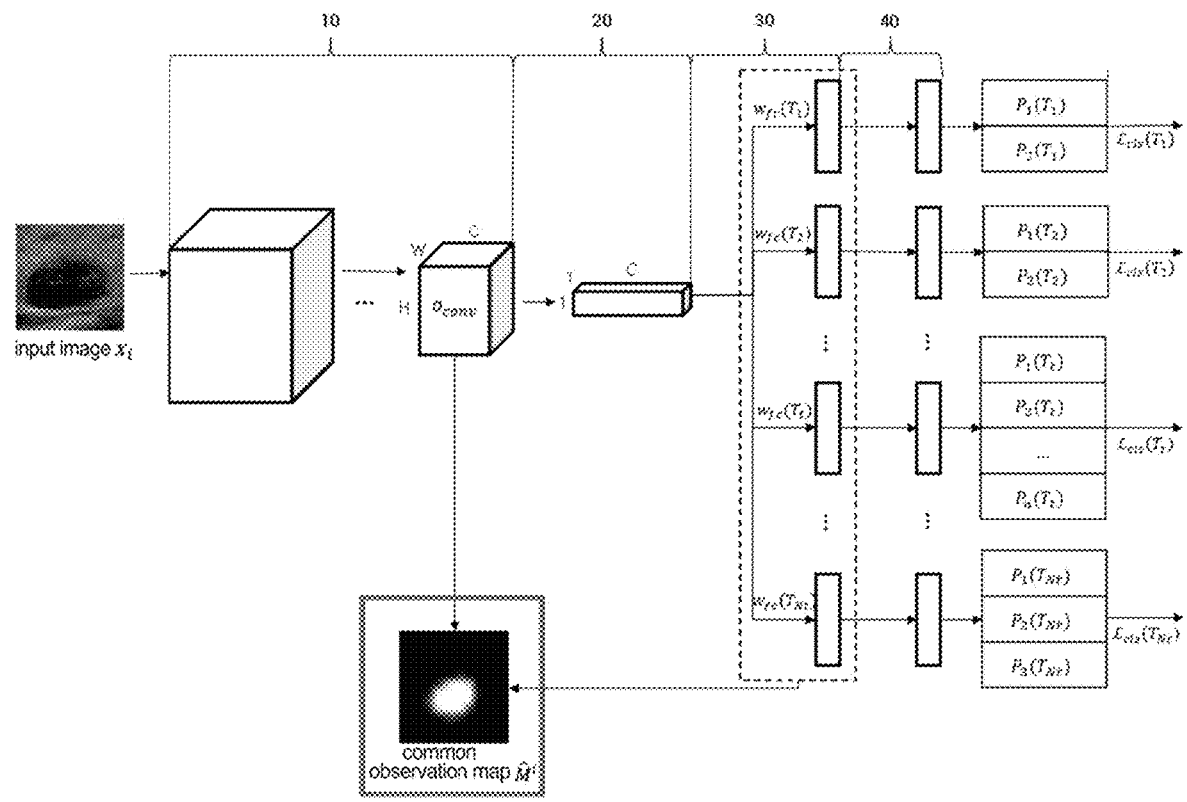

Next, referring to FIGS. 8 and 9E, in step S330, a common observation map i generated on the basis of the class-specific observation maps.

Figure 9F:
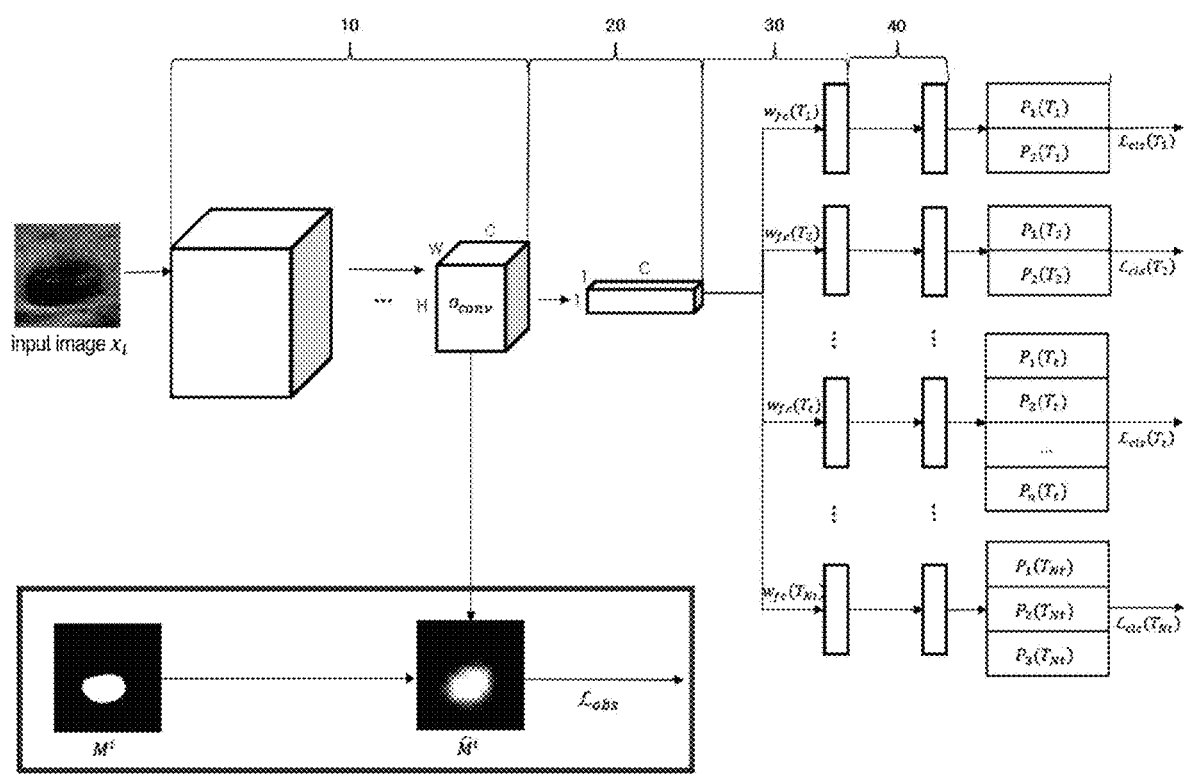
Figure 9G:
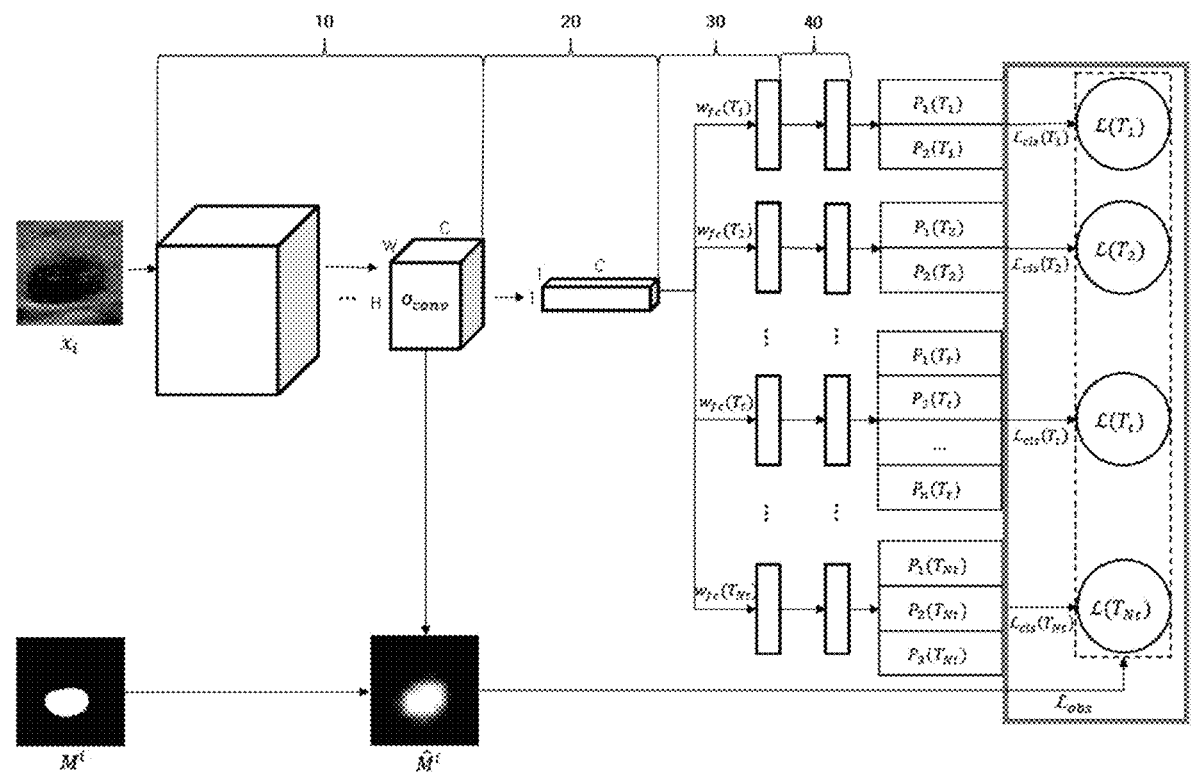

Next, referring to FIGS. 8 and 9F, in step S340, an observation loss $L_{obs}$ is calculated on the basis of a target region $M^i$ of the input image and the common observation map $M^i$ Next, referring to FIGS. 8 and 9G, in step S350, class-specific characteristic losses $L(T_t)$ are calculated on the basis of the class-specific classification losses Las $(T_t)$ and the observation loss $L_{obs}$.

Figure 9H:
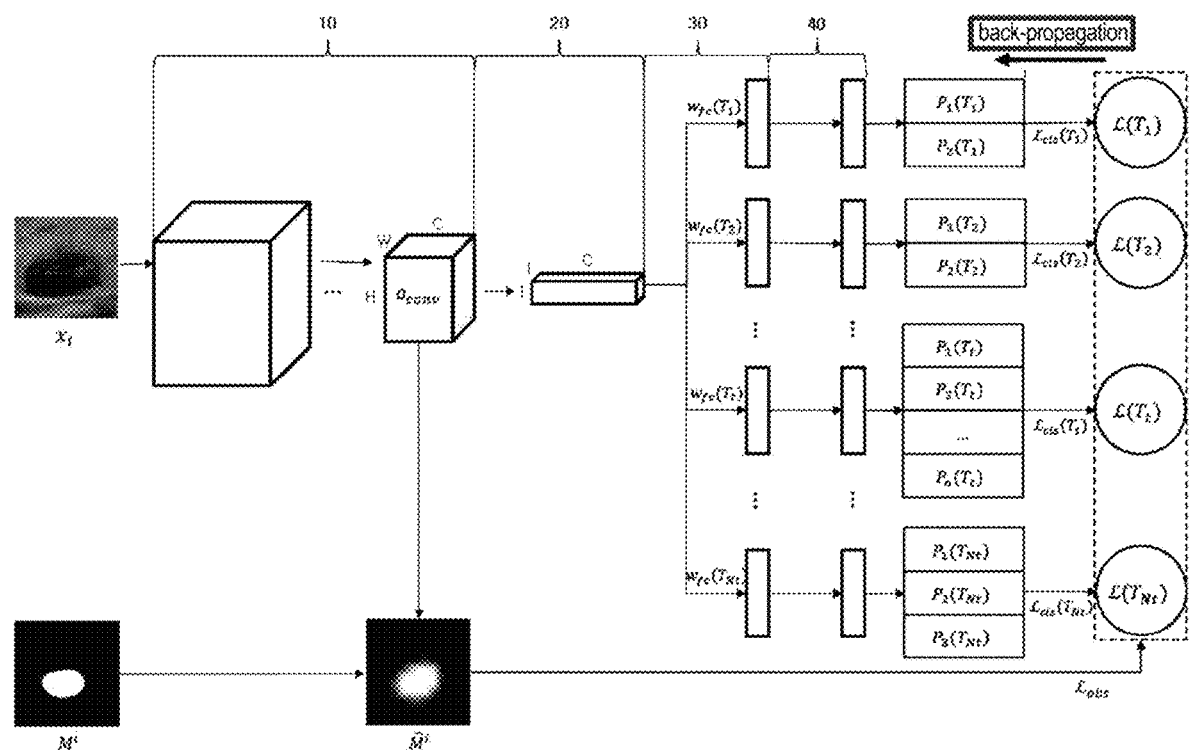

Next, referring to FIGS. 8 and 9H, in step S360, whether or not the class-specific characteristic losses $L(T_t)$ satisfy a training termination condition is determined. In step S360, in a case of not satisfying the training termination condition (i.e. "No"), the class-specific characteristic losses $L(T_t)$ are back-propagated to the class-specific classifiers 40 and the class-specific fully connected layers 30 in step S370.

Accordingly, the class-specific weights $W_{fc}(T_t)$ of the class-specific fully connected layers 30 are adjusted. The processing of the class-specific fully connected layers 30, the processing of the class-specific classifiers 40, and the calculating of the class-specific classification losses (i.e. step S310) are performed again, whereby the class-specific classification losses Los $(T_t)$ are adjusted. The calculating of the class-specific observation maps (i.e. step S320), the calculating of the common observation map (i.e. step S330), and the calculating of the observation loss (i.e. step S340) are performed again, whereby the observation loss $L_{obs}$ is adjusted.

Figure 9I:
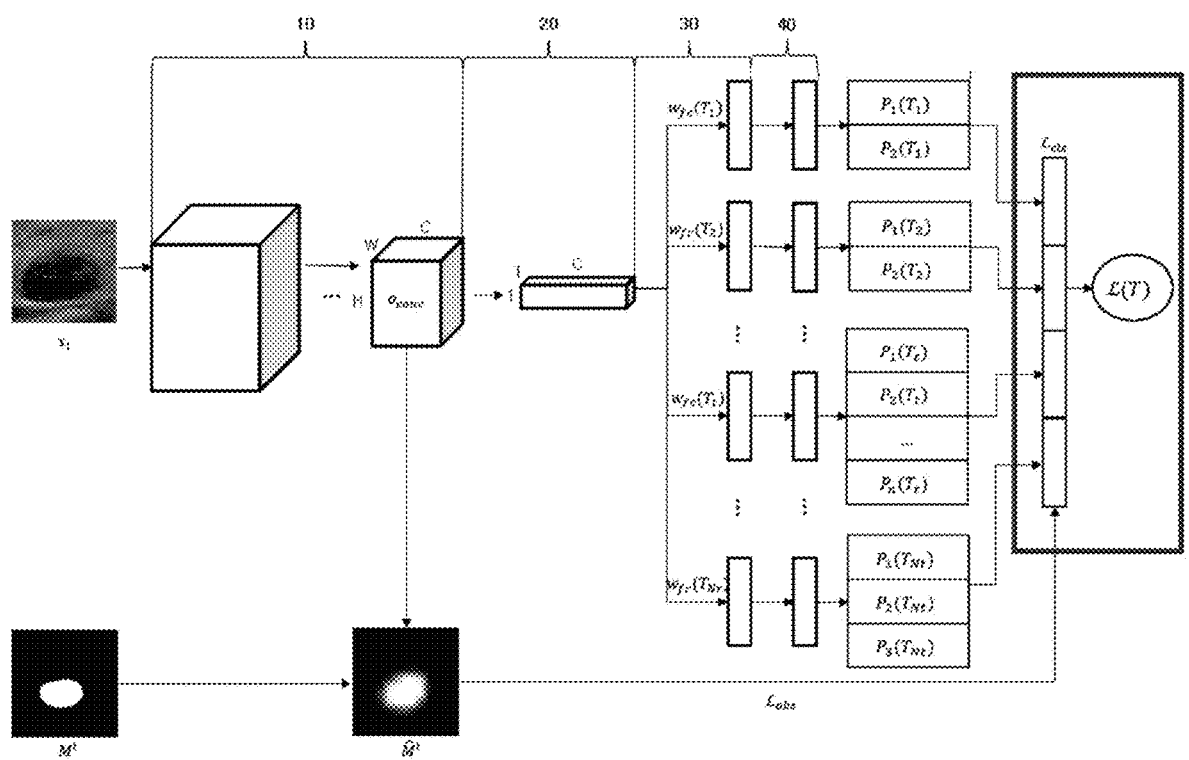

Next, referring to FIGS. 8 and 9I, in step S380, a multi-label classification loss is calculated.

Figure 9J:
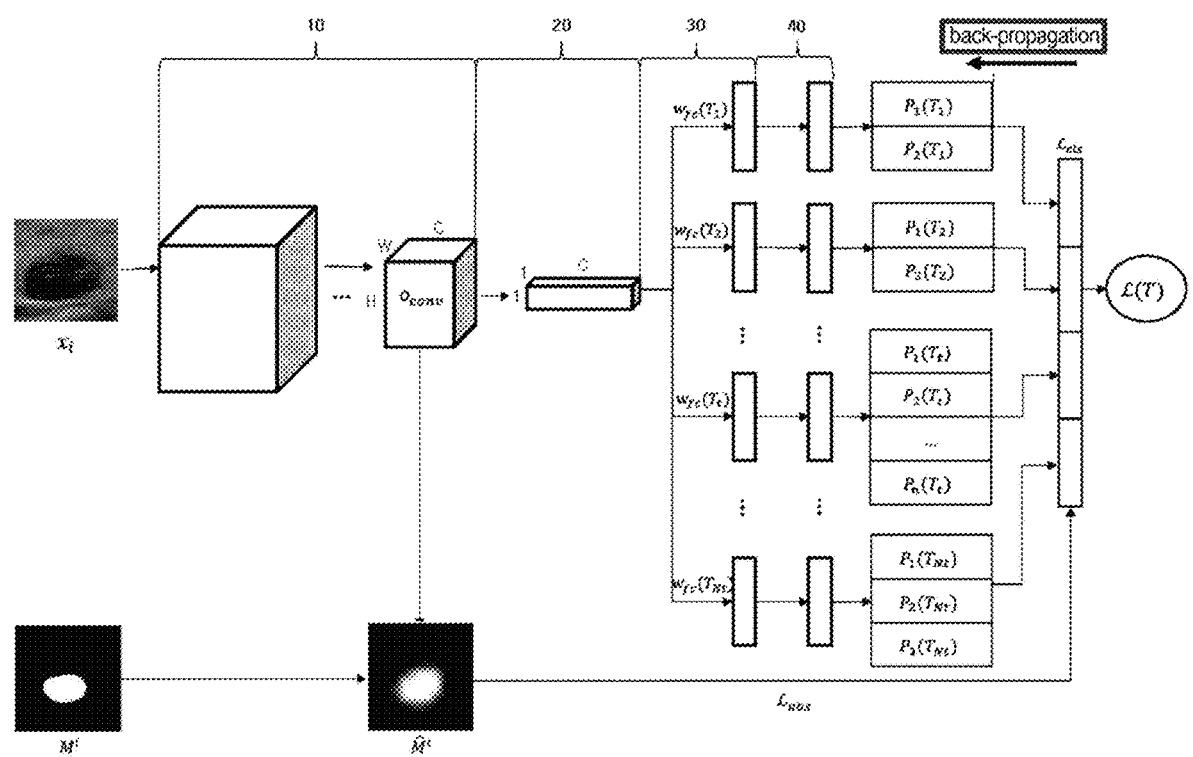

Next, referring to FIGS. 8 and 9J, in step S390, whether or not the multi-label classification loss L(T) satisfies a training termination condition is determined. In step S390, in a case of not satisfying the training termination condition (i.e. "No"), the multi-label classification loss L(T) is back-propagated to the entire neural network model, i.e., the class-specific classifiers 40, the class-specific fully connected layers 30, the pooling layer 20, and the convolution layer 10 in step S400. Accordingly, the parameters of the neural network model may be adjusted.

Figure 10:
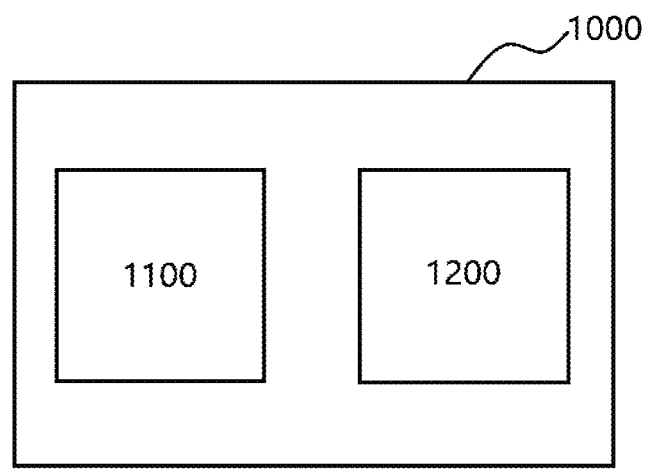
FIG. 10 is a view illustrating a configuration of a neural network model training apparatus according to the exemplary embodiment of the present disclosure.

FIG. 10 is a view illustrating a configuration of a neural network model training apparatus 1000 according to the exemplary embodiment of the present disclosure.

The neural network model training apparatus 1000 includes: a memory 1100 in which a neural network model is stored; and a processor 1200.

The neural network model stored in the memory 1100 has already been described with reference to FIG. 2.

The processor 1200 performs the neural network model training method described with reference to FIGS. 3 to 9. That is, the processor 1200 is configured to input an input image to the convolution layer, calculate a plurality of class-specific observation maps on the basis of output of the convolution layer, calculate an observation loss $L_{obs}$ common to a plurality of classes on the basis of the plurality of class-specific observation maps, and back-propagate a loss based on the observation loss $L_{obs}$ to the neural network model.

As above, the present disclosure has been described in detail through the preferred exemplary embodiments, but the present disclosure is not limited thereto, and it is apparent to those skilled in the art that various changes and applications may be made within the scope of the present disclosure without departing from the technical spirit of the present disclosure. Accordingly, the true protection scope of the present disclosure should be construed by the following claims, and all technical ideas within the scope equivalent thereto should be construed as being included in the scope of the present disclosure.

The invention claimed is:

1. A neural network model training method for complex characteristic classification and common localization of an image, wherein a neural network model comprises:
   a convolution layer configured to perform a convolution operation on an input image by using a convolution filter;
   a pooling layer configured to perform pooling on an output of the convolution layer; and
   a plurality of class-specific fully connected layers configured to respectively correspond to a plurality of classes into which complex characteristics are classified and output values obtained by multiplying an output of the pooling layer by class-specific weights ($W_{fc}(T_t)$),
   wherein different criteria distinguish each of the plurality of classes,
   each of the plurality of classes is classified into a plurality of class-specific characteristics, and
   the neural network model is capable of providing class-specific characteristic probabilities for the class-specific characteristics of each of the plurality of classes according to an output of each class-specific fully connected layer,
   wherein the neural network model training method comprises:
   (a) inputting the input image to the convolution layer;
   (b) calculating class-specific observation maps for the plurality of respective classes on the basis of the output of the convolution layer;
   (c) calculating an observation loss ($L_{obs}$) common to the plurality of classes on the basis of the class-specific observation maps; and
   (d) back-propagating a loss based on the observation loss ($L_{obs}$) to the neural network model,
   wherein step (c) comprises:
   (c-1) generating a common observation map common to the plurality of classes on the basis of the class-specific observation maps; and
   (c-2) calculating the observation loss ($L_{obs}$) by using the common observation map and a target region of the input image, and
   wherein each step is performed by a computer processor
   wherein the observation loss is calculated by calculating a cosine distance for concatenated values obtained by respectively projecting the common observation map and the target region of the input image in horizontal and vertical directions.

2. The method of claim 1, wherein the common observation map is an average value of the class-specific observation maps.

3. The method of claim 1, wherein, in step (b), the class-specific observation maps are calculated by the following equation:

$$\sum_{k=1}^{C} \left( w_{fc}^k(T_t) \times o_{conv}^k \right)$$

(where, $T_t$ denotes the classes, $W_{fc}(T_t)$ denotes the weights of the class-specific fully connected layers, $o_{conv}$ denotes the output of the convolution layer, and C denotes the number of channels).

4. The method of claim 1, wherein the neural network model further includes: a plurality of class-specific classifiers configured to respectively correspond to the plurality of class-specific fully connected layers, and calculate the class-specific characteristic probabilities according to the outputs of the class-specific fully connected layers.

5. The method of claim 4, wherein step (d) comprises:
(d-1) calculating class-specific classification losses ($L_{cls}(T_t)$) on the basis of an output result of each of the plurality of class-specific classifiers;
(d-2) calculating class-specific characteristic losses ($L(T_t)$) on the basis of the observation loss ($L_{obs}$) and the class-specific classification losses ($L_{cls}(T_t)$); and
(d-3) back-propagating, for each class, the class-specific characteristic losses ($L(T_t)$) to the plurality of class-specific classifiers and the plurality of class-specific fully connected layers.

6. The method of claim 5, wherein, in step (d-2), the class-specific characteristic losses ($L(T_t)$) are calculated by the following equation:

$$(1-\alpha)L_{cls}(T_t) + \alpha L_{obs}$$

(where, $0 \le \alpha \le 1$).

7. The method of claim 5, wherein step (d) further comprises:
(d-4) calculating a multi-label classification loss ($L(T)$) on the basis of the plurality of class-specific classification losses ($L_{cls}(T_t)$) and the observation loss ($L_{obs}$); and
(d-5) back-propagating the multi-label classification loss ($L(T)$) to the plurality of class-specific classifiers, the plurality of class-specific fully connected layers, the pooling layer, and the convolution layer.

8. The method of claim 1, wherein the pooling layer is a global average pooling layer.

9. A neural network model training apparatus for complex characteristic classification and common localization of an image and comprising a non-transitory computer-readable memory in which a neural network model is stored and a processor, wherein the neural network model comprises:
a convolution layer configured to perform a convolution operation on an input image by using a convolution filter;
a pooling layer configured to perform pooling on an output of the convolution layer; and
a plurality of class-specific fully connected layers configured to respectively correspond to a plurality of classes into which complex characteristics are classified and output values obtained by multiplying an output of the pooling layer by class-specific weights ($W_{fc}(T_t)$),
wherein different criteria distinguish each of the plurality of classes,
each of the plurality of classes is classified into a plurality of class-specific characteristics, and
the neural network model is capable of providing class-specific characteristic probabilities for the class-specific characteristics of each of the plurality of classes according to an output of each class-specific fully connected layer, and
wherein the apparatus comprises the processor configured to input the input image to the convolution layer, calculate a plurality of class-specific observation maps for the plurality of respective classes on the basis of the output of the convolution layer, generate a common observation map common to the plurality of classes on the basis of the class-specific observation maps, calculate an observation loss ($L_{obs}$) by using the common observation map and a target region of the input image, and back-propagate a loss based on the observation loss ($L_{obs}$) to the neural network model, and
wherein the observation loss is calculated by calculating a cosine distance for concatenated values obtained by respectively projecting the common observation map and the target region of the input image in horizontal and vertical directions.

* * * * *